United States Patent [19]
Suk

[11] Patent Number: 5,768,976
[45] Date of Patent: Jun. 23, 1998

[54] DEVICE FOR AUTOMATICALLY LOCKING THE PRESSURE LID IN ELECTRIC PRESSURE COOKERS

[76] Inventor: Joong Kwang Suk, Dae-Lim Apt. 207-905, 898-2 Pyungchon-Dong, Dongan-Ku, AnYang City KyungKi-Do, 431-070, Rep. of Korea

[21] Appl. No.: 875,861
[22] PCT Filed: May 7, 1996
[86] PCT No.: PCT/KR96/00068
  § 371 Date: Aug. 7, 1997
  § 102(e) Date: Aug. 7, 1997
[87] PCT Pub. No.: WO97/20488
  PCT Pub. Date: Jun. 12, 1997

[30] Foreign Application Priority Data

Dec. 7, 1995 [KR] Rep. of Korea .................. 1995-38967

[51] Int. Cl.⁶ .............................. A47J 27/08; A47J 27/09; B65D 45/00; B65D 45/34
[52] U.S. Cl. .............................. 99/337; 99/403; 220/316; 220/296; 220/325
[58] Field of Search .............................. 99/330, 337, 338, 99/342, 340, 239, 403, 410–417; 220/203, 209, 293, 316, 319, 325, 912; 126/369, 377, 378, 373, 374, 388, 389; 292/256

[56] References Cited

U.S. PATENT DOCUMENTS

| | | | |
|---|---|---|---|
| 4,331,127 | 5/1982 | Grosso | 220/428 X |
| 4,499,357 | 2/1985 | Kojima | 99/325 |
| 4,574,776 | 3/1986 | Hidle | 99/413 X |
| 4,585,925 | 4/1986 | Andre | 99/335 |
| 4,608,260 | 8/1986 | Andre | 426/233 |
| 4,627,417 | 12/1986 | Von Der Becke et al. | 126/369 |
| 4,636,949 | 1/1987 | Longabaugh | 99/332 |
| 4,682,013 | 7/1987 | Andre et al. | 99/330 |
| 4,688,475 | 8/1987 | Witt et al. | 99/325 |
| 4,728,778 | 3/1988 | Choi et al. | 219/438 |
| 4,742,455 | 5/1988 | Schreyer | 99/325 X |
| 4,911,068 | 3/1990 | Koether et al. | 99/403 X |
| 5,092,229 | 3/1992 | Chen | 99/337 |

*Primary Examiner*—Timothy F. Simone
*Attorney, Agent, or Firm*—McDermott, Will & Emery

[57] ABSTRACT

A device for automatically locking or unlocking the pressure lid in electric pressure cookers is disclosed. In the above device, a drive gear which is fixed to the output shaft of a reversible motor gears into a spur gear of the lock ring. A contact protrusion which is provided on the peripheral edge of the lock ring selectively comes into contact with either lock or unlock sensing switches in accordance with a rotating motion of the lock ring, thereby turning on the switch and automatically locking or unlocking the inward protrusions of the lock ring relative to the outward protrusions of the pressure lid. The above device is thus convenient to the user. The device does not have any handle lever exposed outside the cooker, thus neither causing a difficulty in packing the cooker nor spoiling the appearance of the cooker.

1 Claim, 4 Drawing Sheets

5,768,976

DEVICE FOR AUTOMATICALLY LOCKING THE PRESSURE LID IN ELECTRIC PRESSURE COOKERS

TECHNICAL FIELD

The present invention relates in general to a device for automatically locking or unlocking the pressure lid of an electric pressure cooker relative to the lock ring by automatically rotating the lock ring relative to the pressure lid.

BACKGROUND ART

In typical electric pressure cookers, a lock ring with a rubber pressure packing is mounted to the top lid of a cooker, while a handle lever is exposed outside the cooker. In order to lock or unlock the lid relative to the cooker body, the lock ring is operated by manually handling the lever outside the cooker. However, it is somewhat difficult to manually handle the lever as the lever must be handled by force. In addition, the above lid must be forcibly removed under the condition of the interior of the cooker with the pressure packing being highly pressurized. The above cooker thus fails to achieve operational stability and is inconvenient to users. Another problem of the above cooker resides in that the handle lever exposed outside the cooker not only causes a difficulty in packing the cooker, it also spoils the appearance of the cooker.

DISCLOSURE OF THE INVENTION

It is, therefore, an object of the present invention to provide a device for automatically locking or unlocking the pressure lid in electric pressure cookers in which the above problems can be overcome and which automatically locks or unlocks the inward protrusions of the lock ring relative to the outward protrusions of the pressure lid, thus being convenient to the users. The above device does not have any handle lever exposed outside the cooker in difference to the prior art device, thereby neither causing a difficulty in packing the cooker nor spoiling the appearance of the cooker.

In order to accomplish the above object, the present invention provides a device for automatically locking or unlocking a pressure lid in an electric pressure cooker, comprising the pressure lid mounted to the bottom side of a cooker's top lid with a gap therebetween. The pressure lid has a plurality of outward protrusions radially extending outward from the peripheral edge of the pressure lid. A lock ring is movably placed on the lower guide rail and positioned around the peripheral edge of the pressure lid. The ring has a plurality of inward protrusions radially extending inward from the top of the side wall of the ring. The inward protrusions selectively engage with the outward protrusions of the pressure lid to lock the pressure lid to the ring. A plurality of guide rollers are mounted to the bottom of the lock ring and roll on the guide rail when the lock ring is rotated. The above device further comprises a spur gear carrier extending downward from a part of the outside bottom portion of the lock ring. The spur gear carrier passes downward through a guide slit in the guide rail and has a spur gear part on its outside surface. A drive gear gears into the spur gear part. The drive gear is fixed to the output shaft of a reversible motor which is connected to a microcomputer through a motor drive integrated circuit. A lock sensing switch and an unlock sensing switch are placed around the lock ring in close vicinity to the ring. A contact protrusion is provided on the peripheral edge of the lock ring and selectively comes into contact with one of the sensing switches in accordance with a rotating motion of the lock ring, thereby turning on the one switch and automatically locking or unlocking the inward protrusions of the lock ring relative to the outward protrusions of the pressure lid.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
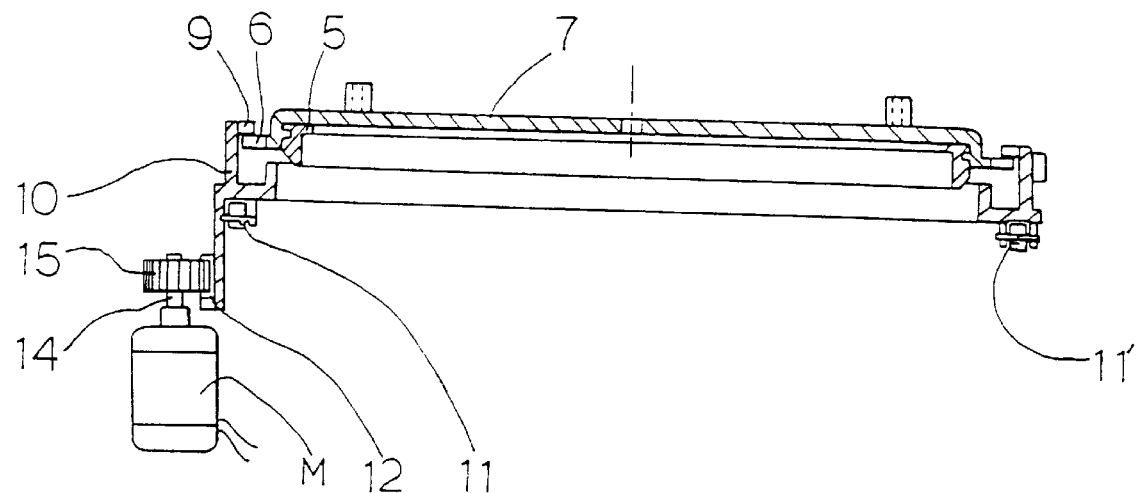
FIG. 1 is a sectional view showing the coupling structure between the pressure lid and the lock ring in an electric pressure cooker with an automatic lid locking device in accordance with a preferred embodiment of the present invention.
Figure 2:
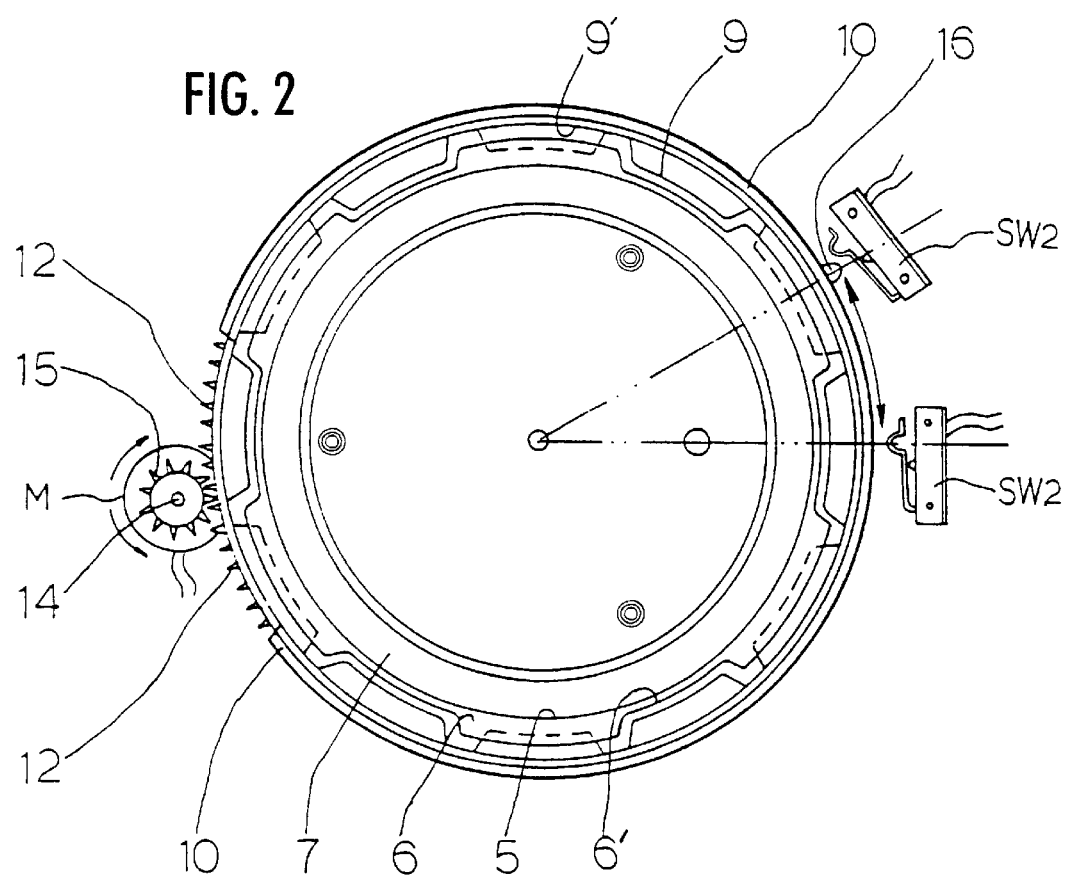
FIG. 2 is a plan view showing the operation of the lid locking device of the present invention.
Figure 3:
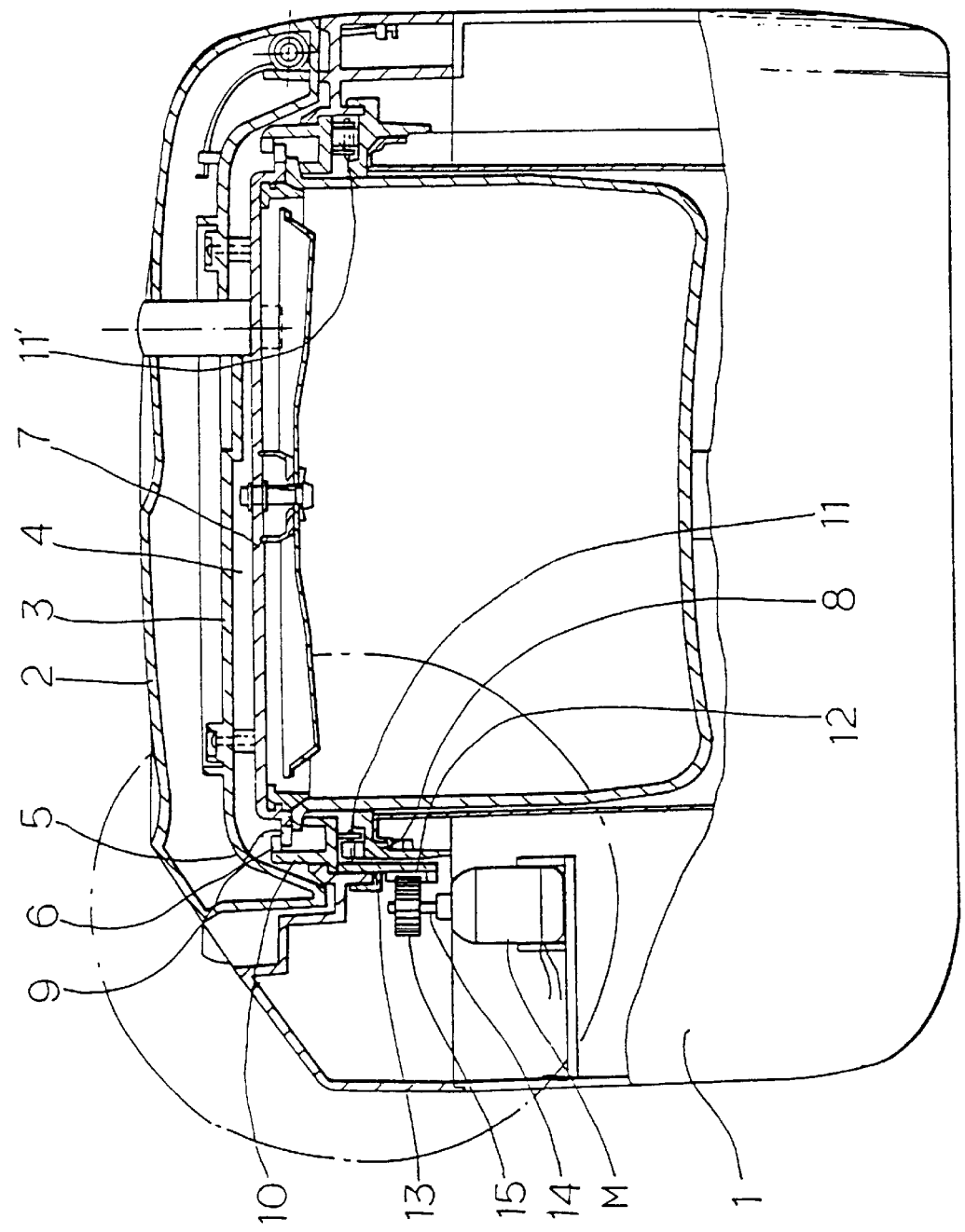
FIG. 3 is a sectional view showing the construction of the electric pressure cooker with the lid locking device of this invention.
Figure 4:
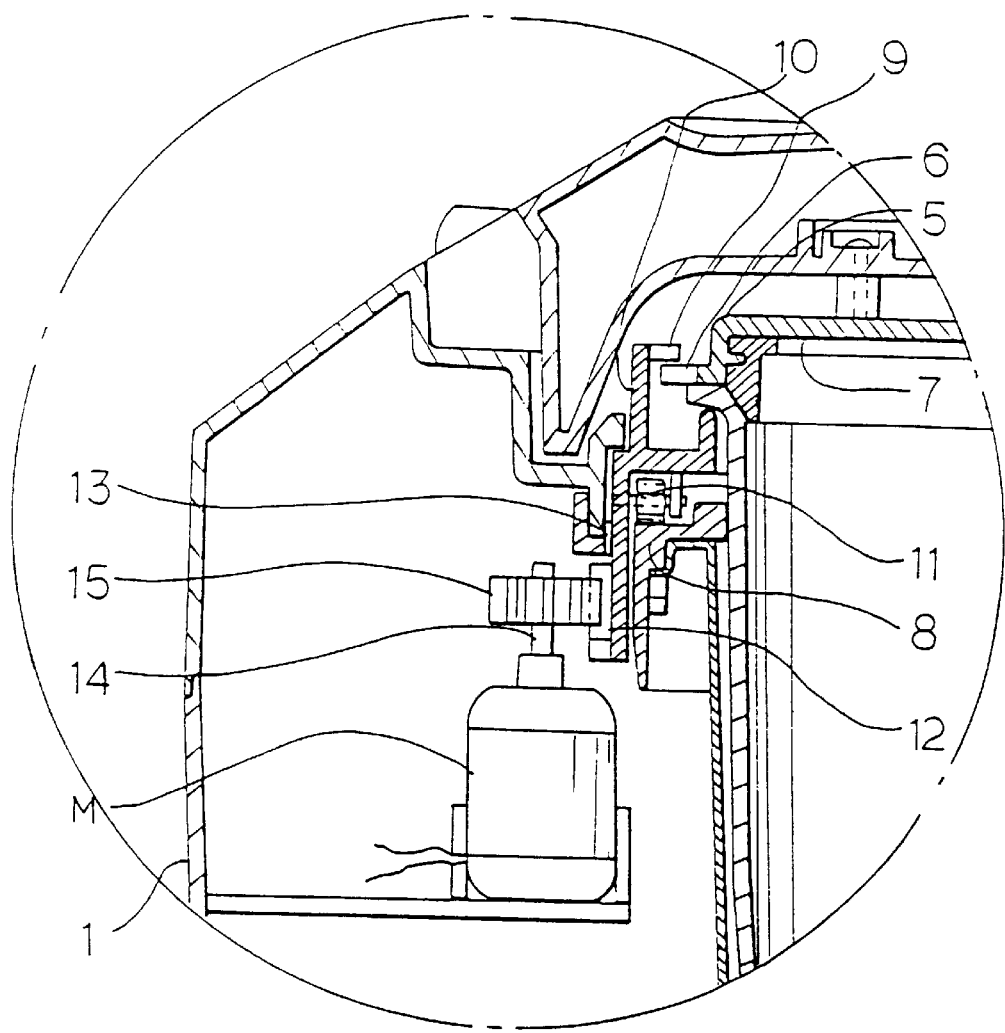
FIG. 4 is an enlarged sectional view showing the construction of the circled portion of FIG. 3 in detail.

FIGS. 1 to 4 show the construction of a device for automatically locking the pressure lid in electric pressure cookers in accordance with a preferred embodiment of the present invention. As shown in the drawings, the circular pressure lid 7 of a cooker 1 is mounted to the bottom side 3 of a cooker's top lid 2 with a gap 4 between the lid 7 and the bottom side 3. The peripheral edge of the above pressure lid 7 is smoothly bent downward to form a circular corner 5 and in turn partially extends radially outward to form a plurality of outward protrusions 6. The outward protrusions 6 are spaced out at regular intervals, thereby defining a plurality of spaces 6' between them. A rounded guide rail 8 is placed under the peripheral edge of the above pressure lid 7 with a space therebetween. Movably placed on the above rail 8 is a lock ring 10 with a plurality of guide rollers 11 and 11'. The above lock ring 10 is also positioned around the peripheral edge of the pressure lid 7. The top of the side wall in the above lock ring 10 partially extends radially inward to form a plurality of inward protrusions 9. The inward protrusions 9 are spaced out at regular intervals to define a plurality of spaces 9' between them. The inward protrusions 9 of the ring 10 are selectively brought into engagement with the outward protrusions 6 of the pressure lid 7 in accordance with a rotating motion of the ring 10, thereby locking the pressure lid 7 to the ring 10. The above guide rollers 11 and 11' are mounted to the bottom of the lock ring 10 and roll on the guide rail 8 when the lock ring 10 is rotated in either direction to lock or unlock the pressure lid 7 relative to the lock ring 10.

In accordance with the present invention, a spur gear carrier 12 extends downward from a part of the outside bottom portion of the lock ring 10. The above carrier 12 passes downward through a guide slit 13 in the guide rail 8 to be exposed outside the slit 13. A spur gear is formed on the outside surface of the above carrier 12 at a portion under the guide slit 13. The spur gear of the above carrier 12 gears into a drive gear 15, which is fixed to the output shaft 14 of a reversible motor M. The above motor M is connected to a microcomputer C through a motor drive integrated circuit (IC) I. A pair of microswitches, that is, a lock sensing switch $SW_1$ and an unlock sensing switch $SW_2$, are placed around the lock ring 10 in close vicinity to the ring 10. The above switches are spaced apart from each other by a predetermined distance. A contact protrusion 16 is provided on the peripheral edge of the lock ring 10. The above contact protrusion 16 selectively comes into contact with one of the sensing switches $SW_1$ and $SW_2$ in accordance with a rotating motion of the lock ring 10, thereby turning on the one switch $SW_1$ or $SW_2$ to automatically lock or unlock the inward protrusions 9 of the lock ring 10 relative to the outward protrusions 6 of the pressure lid 7.

In the above lid locking device, the reversible rotating range of the lock ring 10 is set by the switches $SW_1$ and $SW_2$.

The above spur gear carrier 12 having a predetermined width passes through the guide slit 13 in the guide rail 8 and moves inside the slit 13 in opposite directions. Therefore, the above slit 13 must have an enough length to allow the carrier 12 to move therein by way of the rotating force of the motor M transmitted thereto through the drive gear 15.

Figure 5:
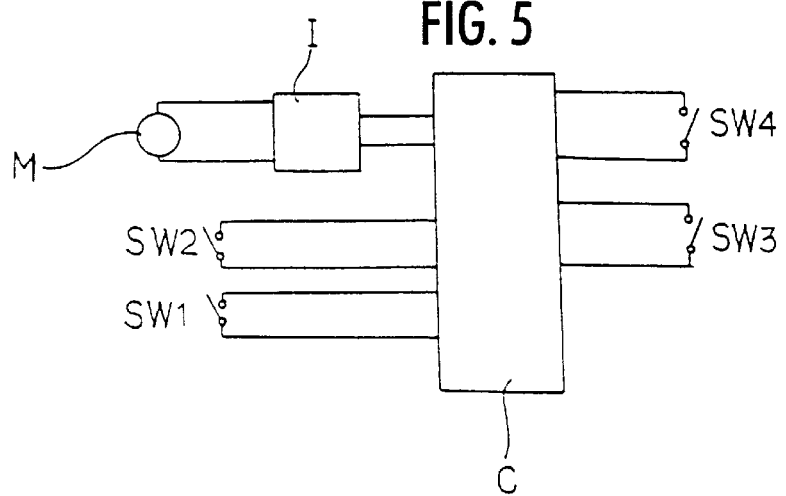
FIG. 5 is a diagram showing a control circuit with the microcomputer, switches and motor in the lid locking device of this invention.
Figure 6:
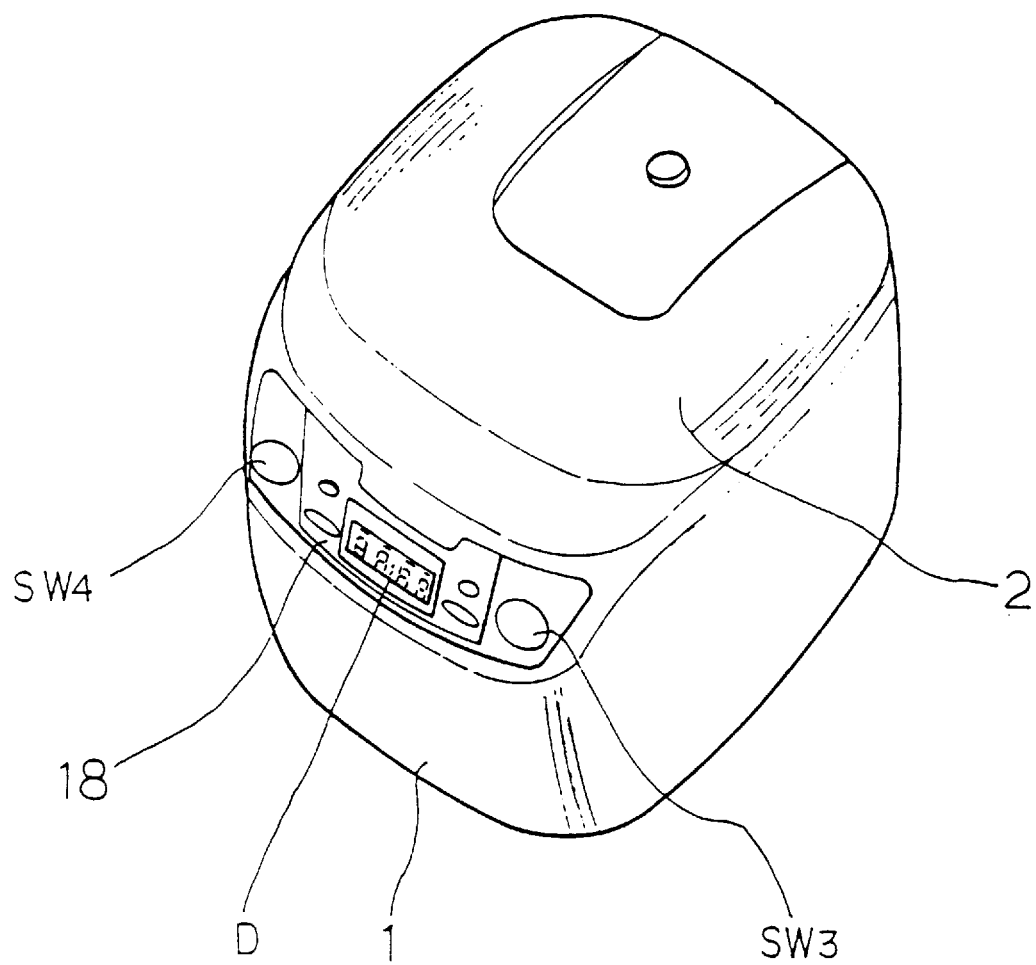
FIG. 6 is a perspective view showing the exterior of the electric pressure cooker with the lid locking device of this invention.
Figure 7:
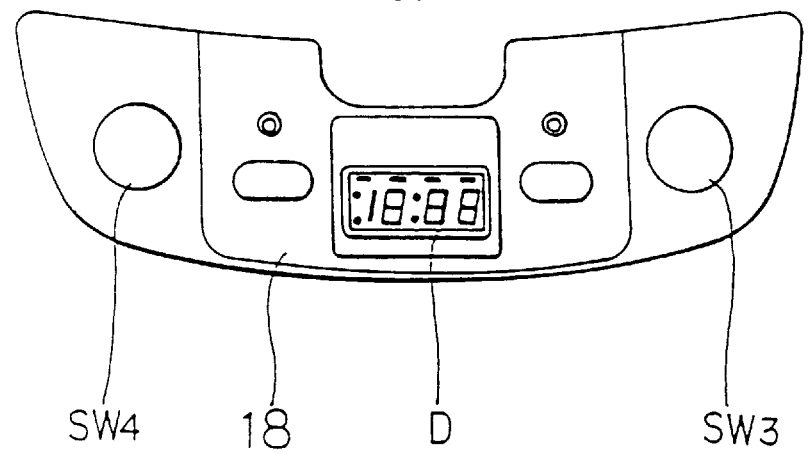
FIG. 7 is a front view showing the construction of the control panel in the above pressure cooker.

FIG. 5 is a diagram showing the control circuit with the microcomputer, switches and motor in the lid locking device of this invention. As shown in FIG. 5, the reversible motor M is connected to the microcomputer C through the motor drive integrated circuit (IC). The control circuit also includes a plurality of switches, that is, lock sensing switch $SW_1$, unlock sensing switch $SW_2$, start switch $SW_3$, withdrawal switch $SW_4$. A control panel 18 is provided on the top front section of the cooker 1. The panel 18 has a display window D for displaying the operational state of the cooker.

When electricity is applied to the above cooker 1, the reversible motor M rotates in the forward direction until the unlock sensing switch $SW_2$ is turned on, thereby bringing the pressure lid 7 of the cooker 1 into the open position where the lid 7 can be freely removed.

In the operation of the cooker 1, the top lid 2 is closed after getting ready to cook. Thereafter, a mode switch is operated to select a desired cooking mode prior to operating the start switch $SW_3$. When the start switch $SW_3$ is operated, the microcomputer C senses the operation of the switch $SW_3$ and in turn rotates the motor M in the reverse direction until the lock sensing switch $SW_1$ is turned on. When the lock sensing switch $SW_1$ is turned on, the motor M stops rotating. The lock ring 10 in the above state has been locked to the pressure lid 7.

In the above operation, the rotating force of the motor M is applied to the lock ring 10 thereby automatically rotating the ring 10 as the drive gear 15, which is fixed to the output shaft 14 of the motor M, gears into the spur gear 12 of the lock ring 10. In addition, the contact protrusion 16 which is provided on the peripheral edge of the lock ring 10 selectively comes into contact with one of the sensing switches $SW_1$ and $SW_2$ in accordance with a rotating motion of the motor M. The protrusion 16 thus turns on the one switch $SW_1$, or $SW_2$, to automatically lock or unlock the inward protrusions 9 of the lock ring 10 relative to the outward protrusions 6 of the pressure lid 7. When the contact protrusion 16 comes into contact with the lock sensing switch $SW_1$, the inward protrusions 9 of the lock ring 10 move from the spaces 6' to the outward protrusions 6 of the pressure lid 7, thereby being stably locked to the pressure lid 7 and resisting the pressure inside the cooker 1 while cooking.

When the cooking operation of the cooker 1 in the above locked state has been finished, the steam is automatically exhausted from the cooker 1 through a steam valve in order to safely take the lid off the cooker 1. Thereafter, the motor M rotates in the forward direction to operate the unlock sensing switch $SW_2$. The display window D of the panel 18 in the above state displays information indicating the end of the cooking cycle. In addition, a buzzer (not shown) is operated to inform the user of the end of the cooking cycle.

In the above lid locking device, the microcomputer C senses the operation of the start and withdrawal switches $SW_3$ and $SW_4$ and determines the time the motor M must rotate in forward or reverse direction. The microcomputer C also senses the operation of the lock and unlock sensing switches $SW_1$ and $SW_2$ and senses the cooking process of the cooker 1.

INDUSTRIAL APPLICABILITY

As described above, the present invention provides a device for automatically locking the pressure lid in electric pressure cookers. In the above device, the circular pressure lid is mounted to the bottom side of a cooker's top lid. The lock ring with a plurality of guide rails is movably placed on a lower guide rail. A drive gear, which is fixed to the output shaft of a reversible motor, gears into a spur gear of the lock ring. A contact protrusion, which is provided on the peripheral edge of the lock ring, selectively comes into contact with either lock or unlock sensing switches in accordance with a rotating motion of the lock ring, thereby turning on the switch and automatically locking or unlocking the inward protrusions of the lock ring relative to the outward protrusions of the pressure lid. The above lid locking device is thus convenient to the user. The device does not have any handle lever exposed outside the cooker in difference to the prior art device, thereby neither causing a difficulty in packing the cooker nor spoiling the appearance of the cooker.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

1. A device for automatically locking or unlocking a pressure lid in an electric pressure cooker, comprising the pressure lid mounted to a bottom side of a cooker's top lid with a gap therebetween, said pressure lid having a plurality of outward protrusions radially extending outward from a peripheral edge of said pressure lid; a lock ring movably placed on a lower guide rail and positioned around the peripheral edge of said pressure lid, said ring having a plurality of inward protrusions radially extending inward from the top of a side wall of said ring, said inward protrusions selectively engaging with said outward protrusions of the pressure lid to lock said pressure lid to said ring; and a plurality of guide rollers mounted to the bottom of said lock ring and rolling on said guide rail when said lock ring is rotated, further comprising:

a spur gear carrier extending downward from a part of an outside bottom portion of said lock ring, said carrier passing downward through a guide slit in said guide rail and having a spur gear part on its outside surface;

a drive gear gearing into said spur gear part, said drive gear being fixed to an output shaft of a reversible motor, said motor being connected to a microcomputer through a motor drive integrated circuit;

a lock sensing switch and an unlock sensing switch placed around said lock ring in close vicinity to said ring;

a contact protrusion provided on a peripheral edge of said lock ring and selectively coming into contact with one of said sensing switches in accordance with a rotating motion of said lock ring, thereby turning on the one switch and automatically locking or unlocking said inward protrusions of the lock ring relative to said outward protrusions of the pressure lid.

* * * * *